US009811659B1

(12) United States Patent
Asheghian

(10) Patent No.: US 9,811,659 B1
(45) Date of Patent: Nov. 7, 2017

(54) SYSTEMS AND METHODS FOR TIME-SHIFTED DETECTION OF SECURITY THREATS

(71) Applicant: Symantec Corporation, Mountain View, CA (US)

(72) Inventor: Daniel Asheghian, Los Gatos, CA (US)

(73) Assignee: Symantec Corporation, Mountain View, CA (US)

( * ) Notice: Subject to any disclaimer, the term of this patent is extended or adjusted under 35 U.S.C. 154(b) by 183 days.

(21) Appl. No.: 14/834,988

(22) Filed: Aug. 25, 2015

(51) Int. Cl.
*G06F 21/00* (2013.01)
*G06F 21/55* (2013.01)
*H04L 29/06* (2006.01)
*G06F 17/30* (2006.01)
*G06F 11/00* (2006.01)
*G06F 12/14* (2006.01)
*G06F 12/16* (2006.01)

(52) U.S. Cl.
CPC ...... *G06F 21/552* (2013.01); *G06F 17/30073* (2013.01); *H04L 63/1416* (2013.01)

(58) Field of Classification Search
None
See application file for complete search history.

(56) References Cited

U.S. PATENT DOCUMENTS

| 7,472,420 B1* | 12/2008 | Pavlyushchik | G06F 21/55 707/999.2 |
| 7,539,871 B1* | 5/2009 | Osborn | G06F 21/564 380/246 |
| 7,627,898 B2* | 12/2009 | Beck | G06F 21/565 713/188 |
| 7,690,038 B1* | 3/2010 | Ko | H04L 63/1425 726/24 |
| 2002/0174349 A1* | 11/2002 | Wolff | G06F 21/565 713/188 |
| 2003/0212906 A1* | 11/2003 | Arnold | G06F 21/566 726/24 |
| 2008/0072324 A1* | 3/2008 | Repasi | G06F 21/566 726/23 |
| 2008/0127346 A1* | 5/2008 | Oh | G06F 21/56 726/23 |

(Continued)

OTHER PUBLICATIONS

Williams, Mike, "5 ways Windows secretly tracks your activities . . . and how to begin restoring your privacy", http://www.techradar.com/us/news/computing/pc/5-ways-windows-secretly-tracks-your-activities-1029906, as accessed Jun. 25, 2015, TechRadar, (Sep. 28, 2011).

*Primary Examiner* — Eric Chen
(74) *Attorney, Agent, or Firm* — FisherBroyles, LLP

(57) ABSTRACT

The disclosed computer-implemented method for time-shifted detection of security threats may include (1) collecting history data that describes activity of the computing system during a past time period, (2) archiving the history data in association with the past time period, (3) identifying a potential security threat to the computing system that was unknown to a software security system during the past time period, and (4) in response to identifying the potential security threat, replaying the history data through the software security system to enable the software security system to determine whether the computing system was affected by the potential security threat during the past time period. Various other methods, systems, and computer-readable media are also disclosed.

18 Claims, 7 Drawing Sheets

(56) References Cited

U.S. PATENT DOCUMENTS

2010/0262584 A1* 10/2010 Turbin ................... G06F 21/564
                                                    707/674
2010/0313268 A1* 12/2010 Abdulhayoglu ...... G06F 21/566
                                                    726/24
2014/0165203 A1*  6/2014 Friedrichs ............... G06F 21/56
                                                    726/24

* cited by examiner

SYSTEMS AND METHODS FOR TIME-SHIFTED DETECTION OF SECURITY THREATS

BACKGROUND

Securing digital systems is an ever-escalating arms race between security providers and attackers that may seek to harm or inappropriately access a system. Software security systems and protective definitions and heuristics are better than ever, and future software security systems will provide coverage against even more threats as new problems are discovered. Similarly, attackers are constantly improving their methods in order to beat the latest security advances. Digital threats may cause their damage and erase their tracks before a detection solution becomes available. Furthermore, threats may evolve over time in order to outpace the development of detection technology while maintaining a presence on the target system. Such issues lead to potential future vulnerabilities, such as if an attacker installs a backdoor onto a system, and may complicate digital forensic analysis, such as when attacks erase evidence of their ever having affected the computing system.

Unfortunately, many traditional software security systems are generally unable to apply their updated detection schemes to the past. Such a failing makes it difficult for a software security system to retroactively detect the presence of devious security threats. The instant disclosure, therefore, identifies and addresses a need for additional and improved systems and methods for time-shifted detection of security threats.

SUMMARY

As will be described in greater detail below, the instant disclosure describes various systems and methods that enable time-shifted detection of security threats by collecting and archiving data describing various states and/or actions of a computing system and using this archive to determine, at a future date, whether or not the computing system was affected by a security threat that was unknown at the time that the archive data was collected.

In one example, a computer-implemented method for time-shifted detection of security threats may include (1) collecting history data from a computing system that describes activity of the computing system during a past time period, (2) archiving the history data in association with the past time period, (3) identifying a potential security threat to the computing system that was unknown to a software security system during the past time period, and (4) in response to identifying the potential security threat, replaying the history data through the software security system to enable the software security system to determine whether the computing system was affected by the potential security threat during the past time period. In some embodiments, replaying the history data through the software security system may be performed in response to an update to the software security system.

Some examples of a potential security threat may include a security threat caused by malicious activity that removed evidence of the malicious activity before the software security system became aware of the potential security threat.

In one embodiment, collecting the history data may include collecting information that describes the state of the computing system. This state information may include settings for an application installed on the computing system, information that identifies applications installed on the computing system, information that identifies files present on the computing system, information that identifies hardware installed on the computing system, a memory dump of the computing system, and/or information that identifies active processes on the computing system. Additionally or alternatively, collecting the history data may include collecting information that describes actions taken by the computing system during the past time period. The information that describes actions taken by the computing system may include an event log, an error log, an auditing log, a configuration file, a registry entry, and/or metadata of the registry entry. Furthermore, collecting the history data may include filtering the actions taken by the computing system to exclude particular types of events from being recorded in the history data.

In further embodiments, archiving the history data may include storing a remote copy of the history data to a remote storage device that is not part of the computing system and also storing a local copy of the history data to a local storage device that is part of the computing system. In such embodiments, replaying the history data through the software security system may include comparing the local copy of the history data to the remote copy of the history data to detect tampering with the local copy of the history data.

In one embodiment, the computer-implemented method may further include determining that the computing system was affected by the potential security threat during the past time period and performing a security action in response to determining that the computing system was affected by the potential security threat during the past time period. In some examples, performing the security action may include alerting a user of the computing system that the computing system was affected by the potential security threat during the past time period, performing a scan of the computing system to determine if the computing system is still affected by the potential security threat, and/or creating a log entry indicating that the computing system was affected by the potential security threat. Moreover, the computer-implemented method may further include determining if the computing system is still affected by the potential security threat.

In one embodiment, a system for implementing the above-described method may include (1) a collection module, stored in memory, that collects history data from a computing system that describes activity of the computing system during a past time period, (2) an archiving module, stored in memory, that archives the history data in association with the past time period, (3) an identification module, stored in memory, that identifies, by a software security system that protects the computing system, a potential security threat to the computing system that was unknown to the software security system during the past time period, (4) a replaying module that, in response to identifying the potential security threat, replays the history data through the software security system to enable the software security system to determine whether the computing system was affected by the potential security threat during the past time period, and (5) at least one physical processor configured to execute the collection module, the archiving module, the identification module, and the replaying module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) collect, from a computing system, history data that describes activity of the computing system during a past time period, (2) archive the history data in association with the past time period, (3) identify, by a software security system that protects the computing system, a potential security threat to the computing system that was unknown to the software security system during the past time period, and (4) in response to identifying the potential security threat, replay the history data through the software security system to enable the software security system to determine whether the computing system was affected by the potential security threat during the past time period.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
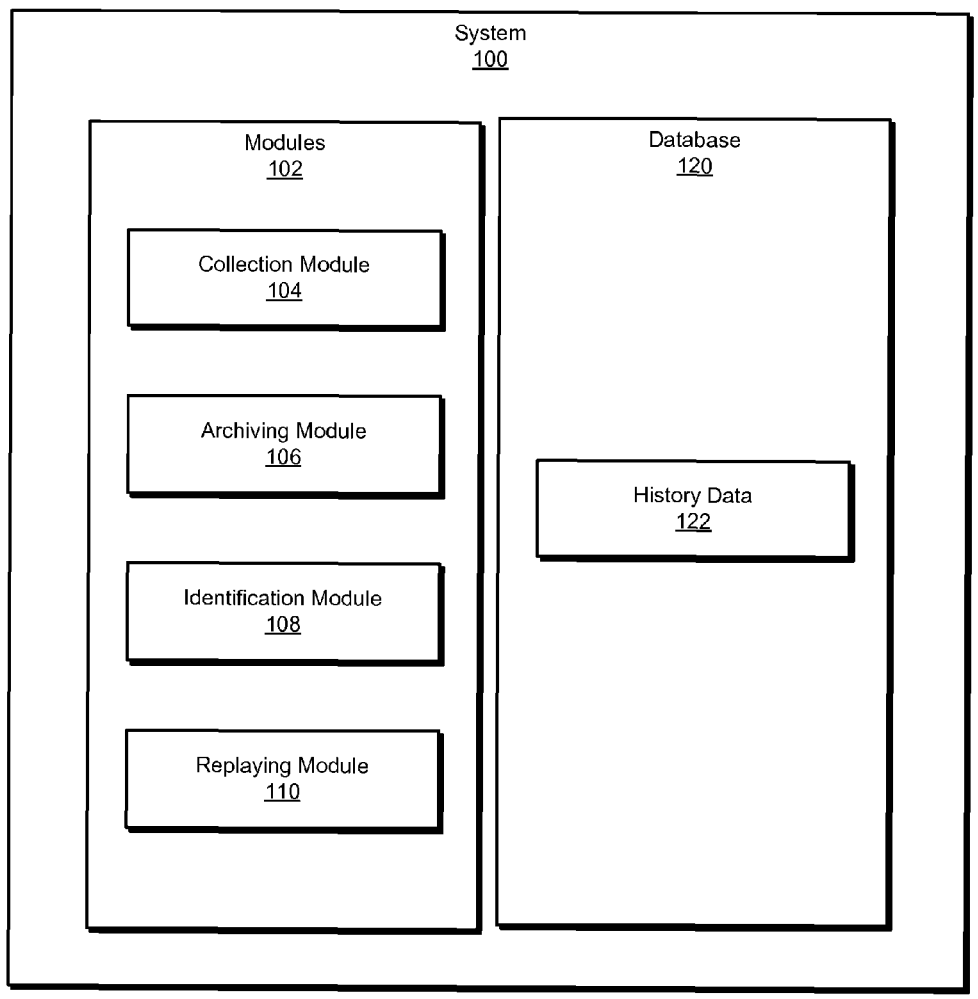
FIG. 1 is a block diagram of an exemplary system for time-shifted detection of security threats.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for time-shifted detection of security threats. As will be explained in greater detail below, systems and methods described herein may enable software security systems to analyze previous states and/or actions of computing systems to determine if the computing systems were affected by security threats at previous points in time. Such security threats may erase records of their presence, but by replaying historic activity and/or state data, security software systems disclosed herein may nevertheless be able to determine if a security threat affected a computing device.

Figure 2:
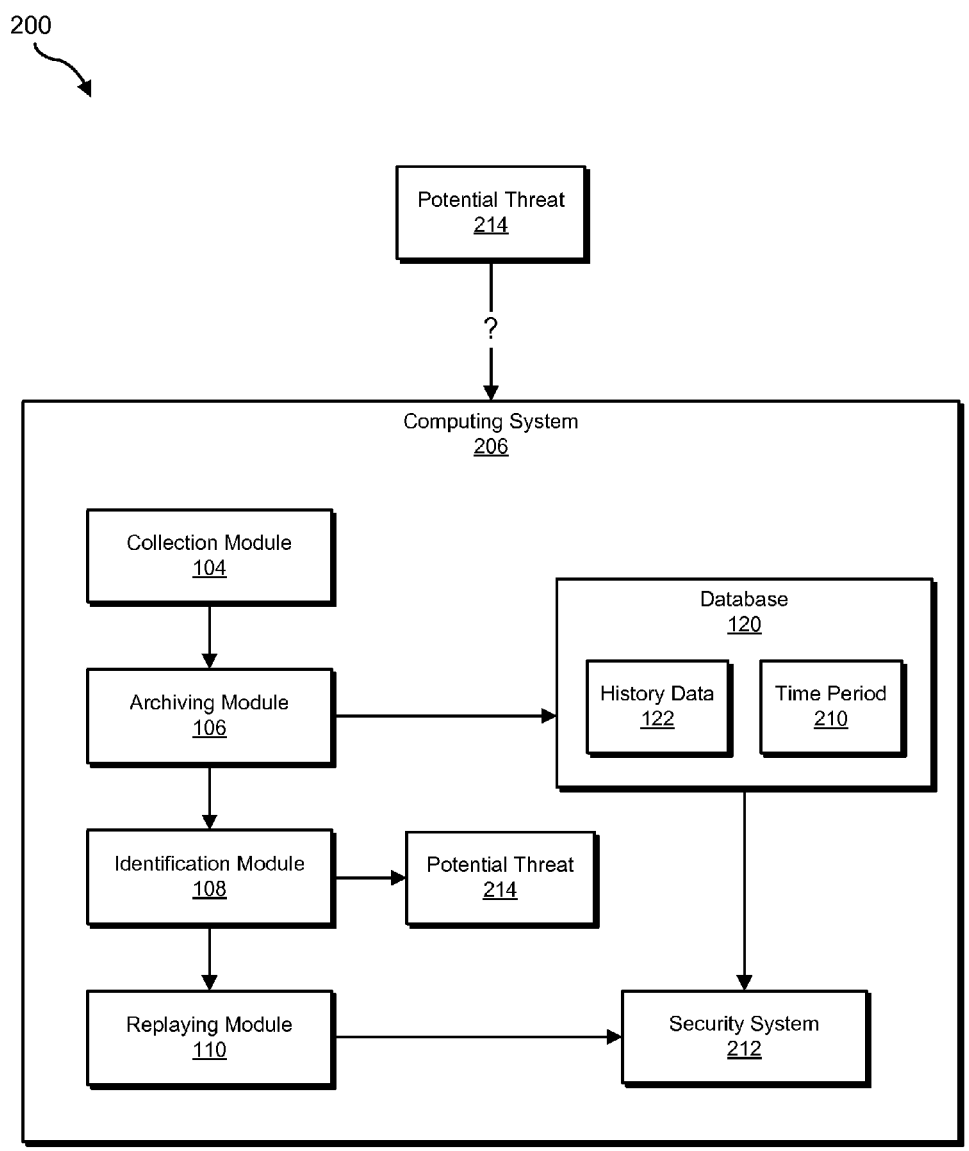
FIG. 2 is a block diagram of an additional exemplary system for time-shifted detection of security threats.

The following will provide, with reference to FIGS. 1-2, detailed descriptions of exemplary systems for time-shifted detection of security threats. Detailed descriptions of corresponding computer-implemented methods will also be provided in connection with FIG. 3. Additional detailed descriptions of exemplary systems for time-shifted detection of security threats will be provided in connection with FIGS. 4-5. Furthermore, detailed descriptions of an exemplary computing system and network architecture capable of implementing one or more of the embodiments described herein will be provided in connection with FIGS. 6 and 7, respectively.

FIG. 1 is a block diagram of exemplary system 100 for time-shifted detection of security threats. As illustrated in this figure, exemplary system 100 may include one or more modules 102 for performing one or more tasks. For example, and as will be explained in greater detail below, exemplary system 100 may include a collection module 104 that collects, from a computing system, history data that describes activity of the computing system during a past time period. Exemplary system 100 may additionally include an archiving module 106 that archives the history data in association with the past time period. Exemplary system 100 may further include an identification module 108 that identifies a potential security threat to the computing system that was unknown during the past time period to a software security system that protects the computing system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store history data 122 that describes actions and/or past states of a computing system. Database 120 may represent portions of a single database or computing device or a plurality of databases or computing devices. For example, database 120 may represent a portion of computing system 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing system 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing system 206 that may be affected by a potential threat 214. In one example, computing system 206 may be programmed with one or more of modules 102 and/or may store all or a portion of the data in database 120. Additionally or alternatively, a remote computing device connected to computing system 206 may be programmed with one or more of modules 102 and/or may store all or a portion of the data in database 120.

In one embodiment, one or more of modules 102 from FIG. 1 may, when executed by at least one processor of computing system 206, enable computing system 206 to analyze past actions and/or states of a computing system for suspicious activity. For example, and as will be described in greater detail below, collection module 104 may collect, from a computing system, history data 122 that describes activity of the computing system during a past time period 210. Archiving module 106 may archive history data 122 in association with past time period 210. Identification module 108 may identify, by a software security system 212 that protects computing system 206, a potential threat 214 to computing system 206 that was unknown to software security system 212 during past time period 210.

Computing system 206 generally represents any type or form of computing device that is capable of recording and analyzing recorded activity history data for the presence of malicious activity. Examples of computing system 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, application servers and/or database servers configured to provide various database services and/or run certain software applications, combinations of one or more of the same, or any other suitable computing device.

History data 122 generally represents any type or form of information that describes the actions and/or state of a computing device at a particular point in time. History data 122 may take a variety of forms, including but not limited to memory dumps, event logs, error logs, auditing logs, configuration files, drive snapshots, registry entries, metadata of any or all of the above, combinations of one or more of the same, portions of one or more of the same, or any other suitable medium for recording the activity of a computing system.

Security system 212 generally represents any type or form of software configured to protect a computing system against unwanted files, executable code, access, activity, or any other undesirable behavior. Examples of security system 212 include, without limitation, antivirus software, firewalls, access control systems, intrusion detection systems, anti-tamper software, combinations of one or more of the same, or any other suitable application for protecting a computing system against unwanted activity.

Potential threat 214 generally represents activity, executable code, files, access, or any other sort of undesirable state or behavior that may affect a computing system in an undesirable way. Potential threat 214 may take a variety of forms. Examples of potential threat 214 include improperly configured software, malicious files, missing files, advanced persistent threats, and/or any other state or behavior that may adversely affect a computing system. As a specific example, an attacker may attempt to take advantage of an improperly configured firewall on a computing system in order to gain illegitimate access to the computing system. In this example, the improperly configured firewall constitutes the potential threat. As an additional example, a virus file may install itself on a computing system, modify several system files, and then erase itself. In this example, the virus file constitutes the potential threat.

As indicated in the example of the virus file above, potential threats may be removed from a computing system before a security system and/or administrator becomes aware that there is a problem. However, the computing system may still have been compromised in some way. In the example of the virus file, the modified system files may persist and cause additional vulnerabilities in the computing system even after the virus erases itself. In the example of the misconfigured firewall, an attacker may gain illegitimate access to the computing system and steal personal information from the computing system. If the firewall configuration is repaired by, for example, a software update or even by the attacker in order to cover their tracks, even updated security systems may fail to notice that the firewall was ever misconfigured and therefore likely be unware that an attacker may have stolen personal information.

Figure 3:
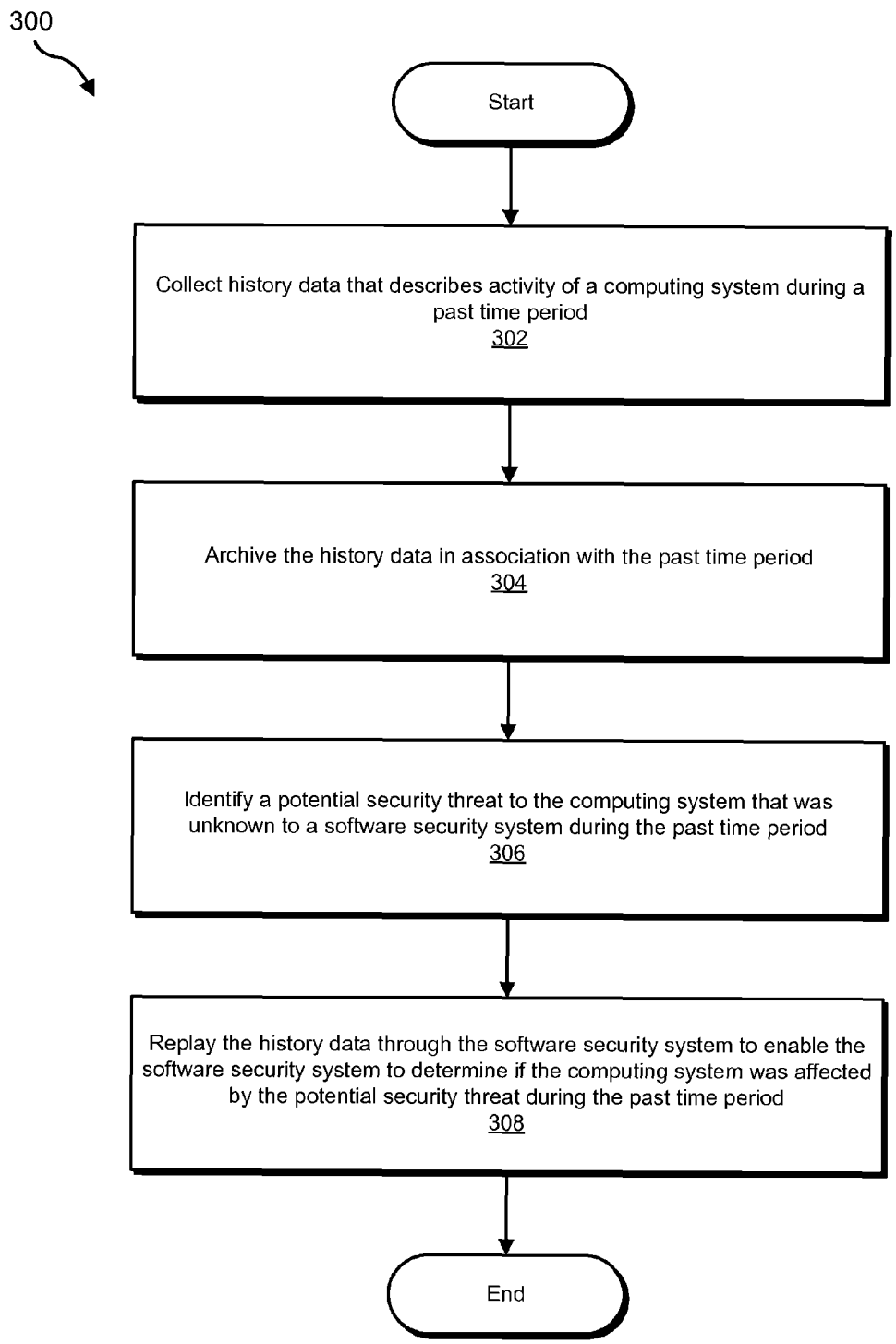
FIG. 3 is a flow diagram of an exemplary method for time-shifted detection of security threats.

FIG. 3 is a flow diagram of an exemplary computer-implemented method 300 for time-shifted detection of security threats. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may collect history data that describes activity of a computing system during a past time period. For example, collection module 104 may, as part of computing system 206 in FIG. 2, collect history data 122 that describes activity of computing system 206 during past time period 210.

Collection module 104 may collect a variety of information for use as history data 122. In one embodiment, collection module 104 may collect information that describes the state of the computing system. Such state information may include settings for an application installed on the computing system, information that identifies applications installed on the computing system, information that identifies files present on the computing system, information that identifies hardware installed on the computing system, a memory dump of the computing system, and/or information that identifies active processes on the computing system. Collection module 104 may additionally or alternatively collect system restore points, snapshots, configuration files, and/or any other suitable information that describes the state of a computing system. Additionally or alternatively, collection module 104 may collect information that describes actions taken by the computing system during past time period 210. The activity information may include an event log, an error log, an auditing log, a configuration file, a registry entry, metadata of the registry entry, and/or any other suitable information that serves as a record of actions taken by a computing system.

Moreover, collection module 104 may collect history data 122 in a variety of ways. In some examples, collection module 104 may record computing system activity as it occurs. For example, collection module 104 may actively monitor process activity on a computing system. Additionally or alternatively, collection module 104 may gather records generated by other software on the computing system. For example, MICROSOFT WINDOWS maintains various event logs that describe administrative, application, and security events taken by a computing system. Collection module 104 may retrieve these logs and store them as part of history data 122.

Although collecting more information about a computing system may enhance a security system's ability to determine whether or not the computing system was affected by a security threat at a point in time, users and/or administrators may wish to restrict the information gathered by collection module 104. In some embodiments, collection module 104 may apply a filter to the collected history data in order to exclude particular types of history data from being recorded. For example, collection module 104 may filter information to protect user privacy. As a specific example, collection module 104 may filter keyboard keystrokes from being recorded as part of history data 122 in order to protect user passwords from being recorded. As an additional specific example, some types of computing system activity may be categorically declared uninteresting (i.e., not useful for determining security vulnerabilities). Collection module 104 may accordingly refrain from recording such uninteresting data in order to preserve system resources such as memory space and processor time. For example, an administrator may decide that local area network access calls are not useful for discovering security vulnerabilities and thus configure collection module 104 to filter local area network access calls from being recorded as part of history data 122.

At step 304 in FIG. 3, one or more of the systems described herein may archive the history data in association with the past time period. For example, archiving module 106 may, as part of computing system 206 in FIG. 2, archive history data 122 in association with past time period 210.

Archiving module 106 may archive the history data in a variety of ways. In some examples, archiving module 106 may store history data 122 on the computing device being protected by system 100. Additionally or alternatively, archiving module 106 may store history data 122 to a remote computing system. Furthermore, archiving module 106 may store multiple copies of history data 122 in multiple locations. For example, archiving module 106 may archive history data 122 by storing a remote copy of history data 122 to a remote storage device that is not part of computing system 206 as well as storing a copy of history data 122 to a local storage device that is part of computing system 206. In such an embodiment, replaying history data 122 through security system 212 may include comparing the local copy of the history data to the remote copy of the history data in order to detect tampering with the local copy of the history data.

Figure 4:
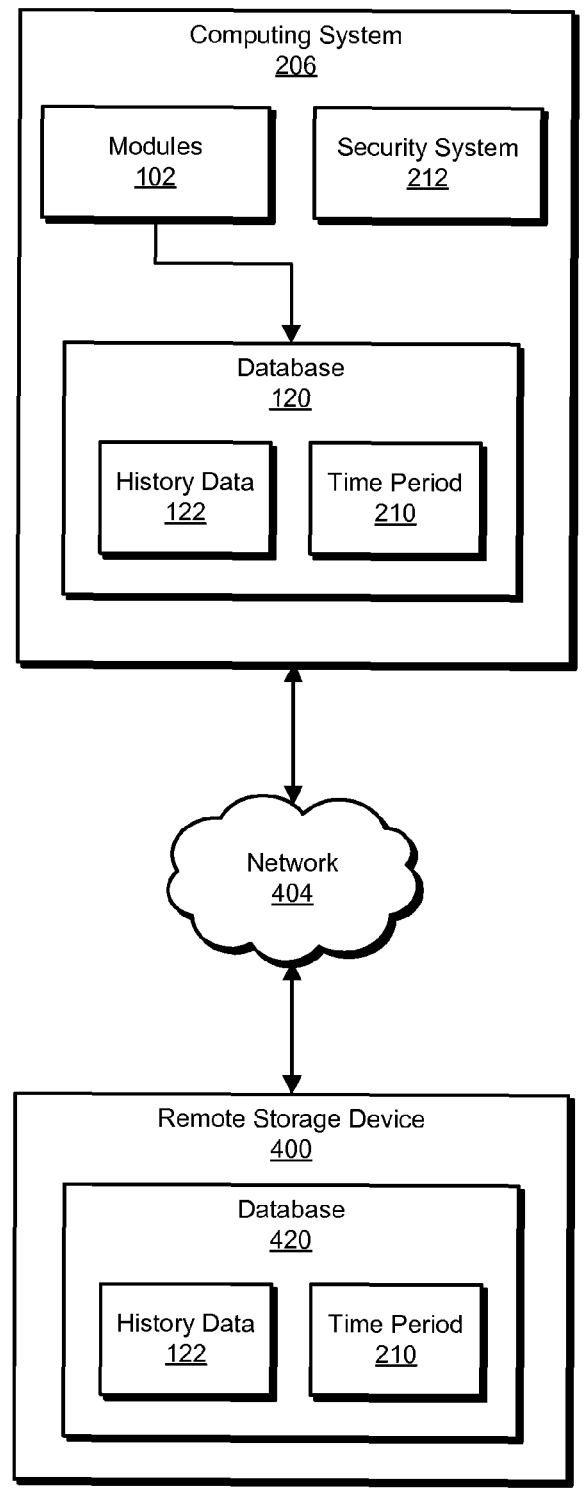
FIG. 4 is a block diagram of an exemplary computing system for time-shifted detection of security threats using a remote storage device.

An exemplary embodiment of such multi-location archiving is provided with reference to FIG. 4. As illustrated in FIG. 4, computing system 206 may be connected to a remote storage device 400 via a network 404. Remote storage device 400 may maintain a database 420 that stores history data 122 in association with time period 210 such that the history data stored in database 420 mirrors the history data stored in database 120.

Remote storage device 400 generally represents any type or form of computing device that is capable of storing recorded history data. Examples of remote storage device 400 include, without limitation, laptops, tablets, desktops, servers, cellular phones, Personal Digital Assistants (PDAs), multimedia players, embedded systems, wearable devices (e.g., smart watches, smart glasses, etc.), gaming consoles, application servers and/or database servers configured to provide various database services and/or run certain software applications, combinations of one or more of the same, or any other suitable means of storing digital information.

Network 404 generally represents any medium or architecture capable of facilitating communication or data transfer. Examples of network 404 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 404 may facilitate communication or data transfer using wireless or wired connections.

Returning to FIG. 4, archiving module 106 may, as part of modules 102, archive history data 122 to database 120 in association with time period 210. Archiving module 106 may additionally archive history data 122 to database 420 on remote storage device 400. Although only a single additional storage device is illustrated in FIG. 4, archiving module 106 may archive history data 122 to any number of remote storage devices. As will be described in greater detail below, security system 212 may replay history data 122 in order to determine if computing system 206 was affected by potential threat 214 during time period 210. Security system 212 may replay the copy of history data 122 stored in database 120, database 420, or both. Additionally, security system 212 may compare the copy of history data 122 stored in database 120 to the copy of history data 122 stored in database 420 in order to detect modifications or tampering with history data 122.

Returning to FIG. 3 at step 306, one or more of the systems described herein may identify, a potential security threat to the computing system that was unknown to the software security system during the past time period. For example, identification module 108 may, as part of computing system 206 in FIG. 2, identify a potential security threat to the computing system that was unknown to software security system 212 during past time period 210.

As described above, the potential security threat may include a security threat caused by malicious activity that removed evidence of the malicious activity before the software security system became aware of the potential security threat. Such threats may be difficult to detect because they are no longer present on the computing system by the time security software receives information on how to identify the threat. For example, an attacker may invade a system using a security vulnerability, manage miscellaneous mischief, and then erase logs and close the security vulnerability that would otherwise show evidence that the computing system was compromised. As will be discussed in greater detail below, by recording and analyzing history data from a computing system, security systems may nevertheless be able to identify that a computing system was previously affected by a vulnerability once the security systems learn how to detect said vulnerability.

Identification module 108 may identify the security threat in a variety of ways. In one embodiment, identification module 108 may operate as part of security system 212. Security system 212 may receive a definitions update that enables it to recognize potential threat 214. As an additional example, identification module 108 may operate as part of a heuristic-based detection system that determines a particular application's behavior as suspicious. Identification module 108 may then identify the newly-identified suspicious application as potential threat 214. Additionally or alternatively, identification module 108 may suspicious network activity as a potential threat. Once identification module 108 identifies potential threat 214, systems and methods described herein may respond to protect the computing system.

At step 308 in FIG. 3, one or more of the systems described herein may, in response to identifying the potential security threat, replay the history data through the software security system to enable the software security system to determine if the computing system was affected by the potential security threat during the past time period. For example, replaying module 110 may, as part of computing system 206 in FIG. 2, replay history data 122 through security system 212 to enable security system 212 to determine whether or not computing system 206 was affected by potential threat 214 during time period 210.

Replaying module 110 may replay history data 122 in a variety of contexts. In some embodiments, replaying module 110 may replay the history data through the software security system in response to an update to the software security system. For example, anti-malware software generally receives regular updates from its publisher in order to allow the software to keep up with the latest discovered threats. Such an update may accordingly enable the security software to detect threats that it was previously unaware of. In the example of FIG. 2, security system 212 may receive an update (not illustrated) that enables it to detect potential threat 214. Replaying module 110 may replay history data 122 through security system 212 in response to security system 212 receiving the update.

In some embodiments, systems and methods described herein may determine whether or not the computing system was affected by the potential threat during the past time period. For example and as illustrated in FIG. 2, security system 212 may, in response to replaying module 110 replaying history data 122 through security system 212, determine that computing system 206 was affected by potential threat 214 during time period 210. Furthermore, security system 212 may perform a security action in response to determining that the computing system was affected by the potential security threat during the past time period. Security system 212 may perform a variety of security actions, such as alerting a user of the computing system that the computing system was affected by the potential security threat during the past time period, performing a scan of the computing system to determine if the computing system is still affected by the potential security threat, creating a log entry indicating that the computing system was affected by the potential security threat, and/or any other appropriate security action intended to protect the computing system from the potential threat.

Figure 5:
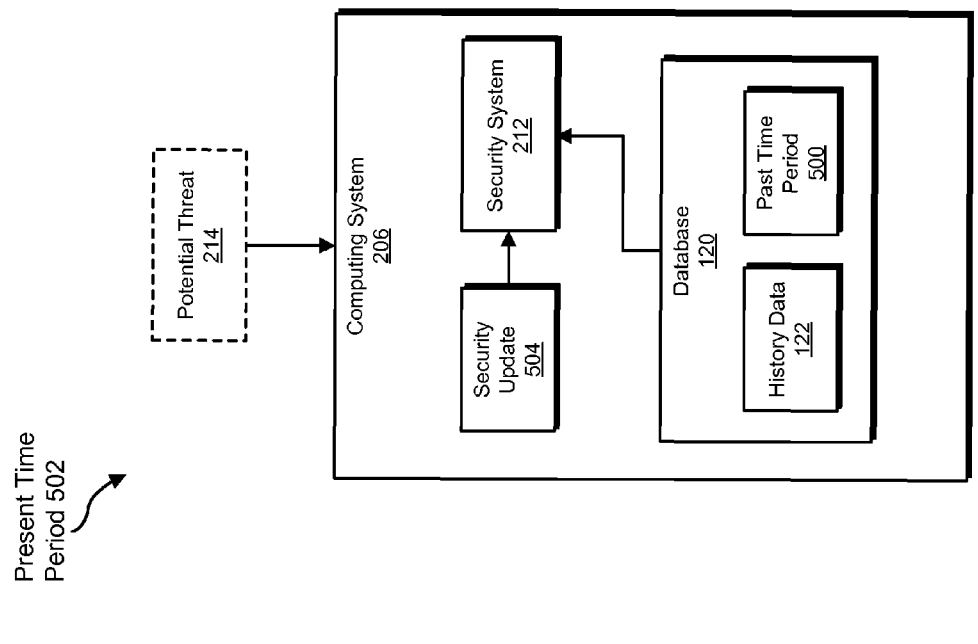
FIG. 5 is a block diagram of an exemplary computing system for time-shifted detection of security threats.
Figure 5:
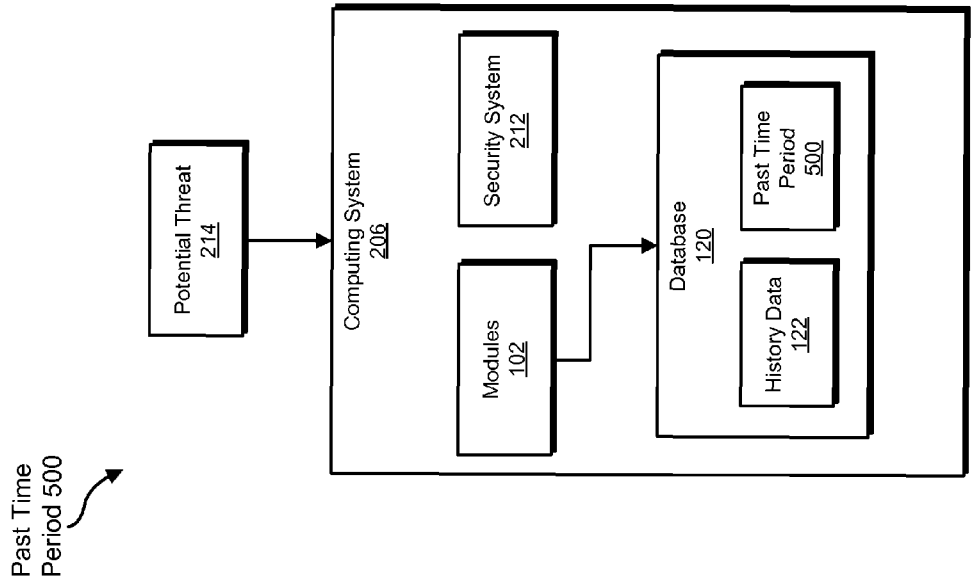

An illustrated example is shown with reference to FIG. 5. As shown in FIG. 5, computing system 206 may be programmed with one or more of modules 102 as well as security system 212. As shown during a past time period 500, e.g., last month, one or more of modules 102 may archive history data 122 to database 120 in association with past time period 500. Unbeknownst to security system 212, computing system 206 may be exposed to potential threat 214. Potential threat 214 may then attempt to erase evidence of its existence in order to confound security system 212 such as by deleting an event log entry. At a later date, such as present time period 502, security system 212 may receive a security update 504 that enables security system 212 to detect potential threat 214. Even though computing system 206 may no longer be affected by potential threat 214 during present time period 502, evidence of its presence may nevertheless be recorded in history data 122. Examples of such evidence may include a record of potential threat 214 altering the event log. Such evidence can be gleaned by security system 212 upon replaying and scanning history data 122 for the presence of potential threat 214. Security system 212 detecting a potential threat may trigger further action on the part of systems and methods described herein.

In some examples, some or all of system 200 may be split across multiple computing systems. As described in greater detail above in connection with FIG. 4, archiving module 106 may archive history data 122 on a remote storage device. Additionally or alternatively, collection module 104 may operate as part of a device remote from the computing system to be protected. For example, computing system 206 in FIG. 2 may be a client system to a security server (not illustrated) that protects multiple computing systems or against potential threats. In such an example, the server may be programmed with one or more of modules 102, including collection module 104, which may include a collection agent on computing system 206. This collection agent may collect history data 122 from computing system 206 and transmit history data 122 to the server which may archive history data 122.

As described above, the systems and methods described herein may enable a security system to peer into the past to determine whether or not a computing system was previously affected by a security threat that was previously unknown to the security system. Systems and methods described herein may enable such functionality by creating a history of information that describes the actions and/or state of a computing device at various points in time. This historical data can then be scanned by the security system for potential security threats.

Figure 6:
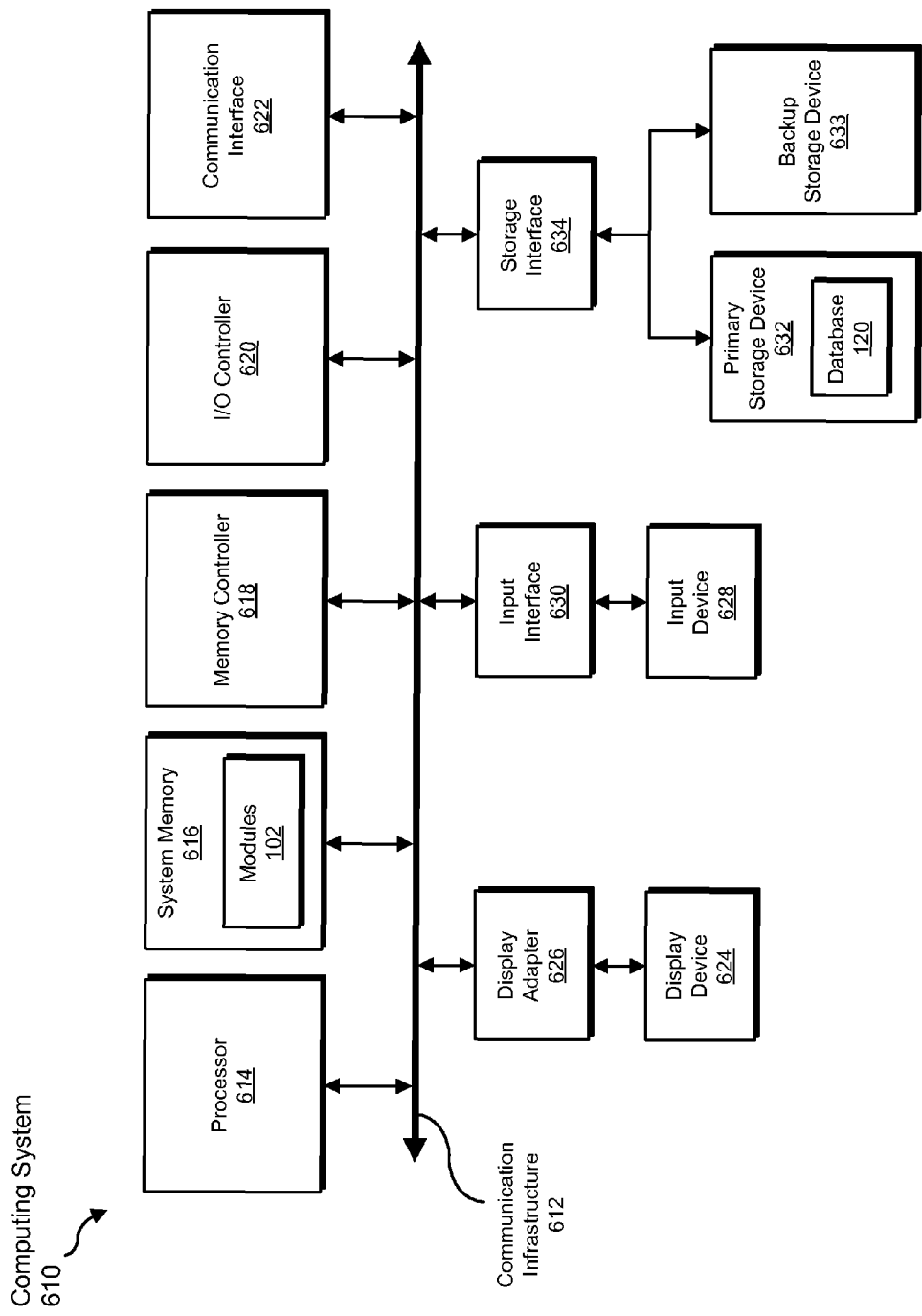
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
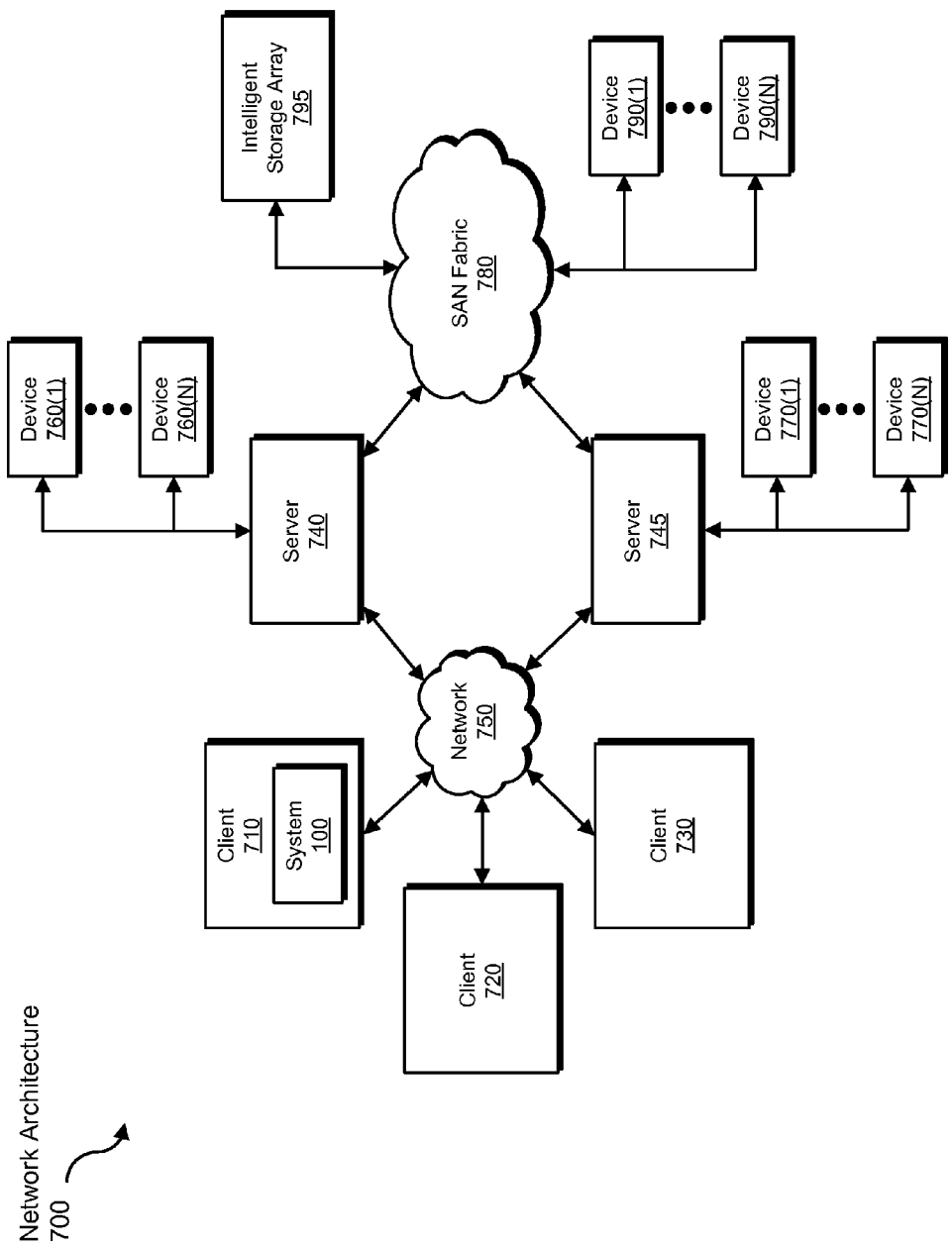
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for time-shifted detection of security threats.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information about a computing system to be transformed, transform the information into archived history data, store a result of the transformation to a database, provide a result of the transformation to a security system in order to identify potential security threats that may have affected the computing system in the past, and/or use a result of the transformation to inform a security action designed to protect the computing system from the identified threat. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for time-shifted detection of security threats, at least a portion of the method being performed by a computing device comprising at least one processor, the method comprising:
   collecting, from a computing system, history data that describes activity of the computing system during a past time period;
   archiving the history data in association with the past time period;
   identifying, by a software security system that protects the computing system, a potential security threat to the computing system that:
      was unknown to the software security system during the past time period;
      is not currently present on the computing system; and
      wherein the potential security threat comprises a security threat caused by malicious activity that removed evidence of the malicious activity before the software security became aware of the potential threat; and
   in response to identifying the potential security threat, replaying the history data through the software security system to enable the software security system to determine whether the computing system was affected by the potential security threat during the past time period.

2. The method of claim 1, wherein replaying the history data through the software security system is performed in response to an update to the software security system.

3. The method of claim 1, wherein:
   archiving the history data comprises:
      storing a remote copy of the history data to a remote storage device that is not part of the computing system; and
      storing a local copy of the history data to a local storage device that is part of the computing system; and
   replaying the history data through the software security system comprises comparing the local copy of the history data to the remote copy of the history data to detect tampering with the local copy of the history data.

4. The method of claim 1, wherein:
   collecting the history data comprises collecting information that describes the state of the computing system; and
   the information that describes the state of the computing system comprises at least one of:
      settings for an application installed on the computing system;
      information that identifies applications installed on the computing system;
      information that identifies files present on the computing system;
      information that identifies hardware installed on the computing system;
      a memory dump of the computing system; and
      information that identifies active processes on the computing system.

5. The method of claim 1, wherein:
   collecting the history data comprises collecting information that describes actions taken by the computing system during the past time period; and
   the information that describes actions taken by the computing system comprises at least one of:
      an event log;
      an error log;
      an auditing log;
      a configuration file;
      a registry entry; and
      metadata of the registry entry.

6. The method of claim 1, wherein collecting the history data comprises filtering the actions taken by the computing system to exclude particular types of events from being recorded in the history data.

7. The method of claim 1, further comprising:
   determining, in response to replaying the history data through the software security system, that the computing system was affected by the potential security threat during the past time period; and
   performing a security action in response to determining that the computing system was affected by the potential security threat during the past time period.

8. The method of claim 7, wherein performing the security action comprises at least one of:
   alerting a user of the computing system that the computing system was affected by the potential security threat during the past time period;
   performing a scan of the computing system to determine if the computing system is still affected by the potential security threat; and
   creating a log entry indicating that the computing system was affected by the potential security threat.

9. The method of claim 1, wherein identifying the potential security threat comprises receiving, at the software security system, information that enables the software security system to identify the potential security threat.

10. A system for time-shifted detection of security threat, the system comprising:
   a collection module, stored in memory, that collects, from a computing system, history data that describes activity of the computing system during a past time period;
   an archiving module, stored in memory, that archives the history data in association with the past time period;
   an identification module, stored in memory, that identifies, by a software security system that protects the computing system, a potential security threat to the computing system that;
      was unknown to the software security system during the past time period;
      is not currently present on the computing system; and
      wherein the potential security threat comprises a security threat caused by malicious activity that removed evidence of the malicious activity before the software security became aware of the potential threat;
   a replaying module that, in response to identifying the potential security threat, replays the history data through the software security system to enable the software security system to determine whether the computing system was affected by the potential security threat during the past time period; and at least one physical processor configured to execute the collection module, the archiving module, the identification module, and the replaying module.

11. The system of claim 10, wherein the replaying module replays the history data through the software security system in response to an update to the software security system.

12. The system of claim 10, wherein:
the archiving module archives the history data by:
  storing a remote copy of the history data to a remote storage device that is not part of the computing system; and
  storing a local copy of the history data to a local storage device that is part of the computing system; and
the replaying module replays the history data through the software security system by comparing the local copy of the history data to the remote copy of the history data to detect tampering with the local copy of the history data.

13. The system of claim 10, wherein:
the collection module collects the history data by collecting information that describes the state of the computing system; and
the information that describes the state of the computing system comprises at least one of:
  settings for an application installed on the computing system;
  information that identifies applications installed on the computing system;
  information that identifies files present on the computing system;
  information that identifies hardware installed on the computing system;
  a memory dump of the computing system; and
  information that identifies active processes on the computing system.

14. The system of claim 10, wherein:
the collection module collects the history data by collecting information that describes actions taken by the computing system during the past time period; and
the information that describes actions taken by the computing system comprises at least one of:
  an event log;
  an error log;
  an auditing log;
  a configuration file;
  a registry entry; and
  metadata of the registry entry.

15. The system of claim 10, wherein the collection module collects the history data by filtering the actions taken by the computing system to exclude particular types of events from being recorded in the history data.

16. The system of claim 10, wherein the software security system:
  determines, in response to the replaying module replaying the history data through the software security system, that the computing system was affected by the potential security threat during the past time period; and
  performs a security action in response to determining that the computing system was affected by the potential security threat during the past time period.

17. The system of claim 16, wherein the software security system performs the security action by at least one of:
  alerting a user of the computing system that the computing system was affected by the potential security threat during the past time period;
  performing a scan of the computing system to determine if the computing system is still affected by the potential security threat; and
  creating a log entry indicating that the computing system was affected by the potential security threat.

18. A non-transitory computer-readable medium comprising one or more computer-readable instruction that, when executed by at least one processor of a computing device, cause the computing device to:
  collect, from a computing system, history data that describes activity of the computing system during a past time period;
  archive the history data in association with the past time period;
  identify, by a software security system that protects the computing system, a potential security threat to the computing system that:
    was unknown to the software security system during the past time period;
    is not currently present on the computing system; and
    wherein the potential security threat comprises a security threat caused by malicious activity that removed evidence of the malicious activity before the software security became aware of the potential threat; and
  in response to identifying the potential security threat, replay the history data through the software security system to enable the software security system to determine if the computing system was affected by the potential security threat during the past time period.

* * * * *